(No Model.) 2 Sheets—Sheet 1.
T. J. BAKER & A. J. STANCHFIELD.
TRAP FOR FLIES OR OTHER INSECTS.
No. 427,290. Patented May 6, 1890.
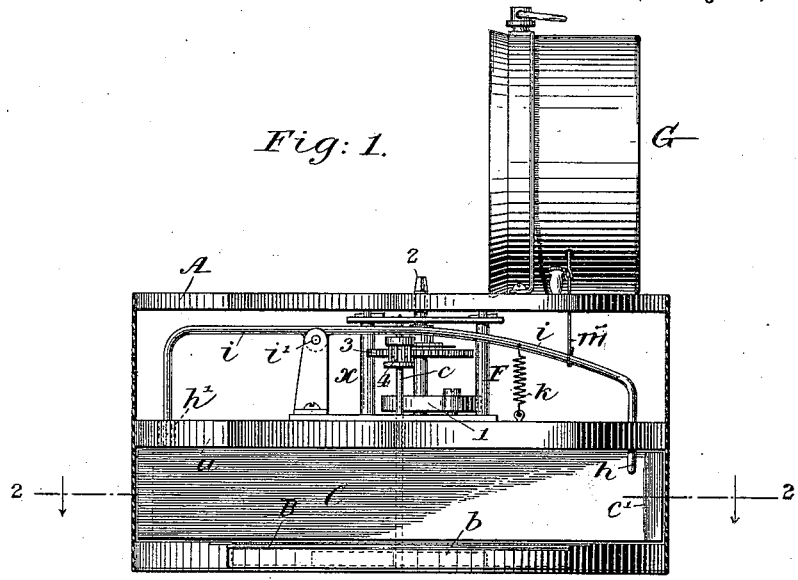
Fig: 1.
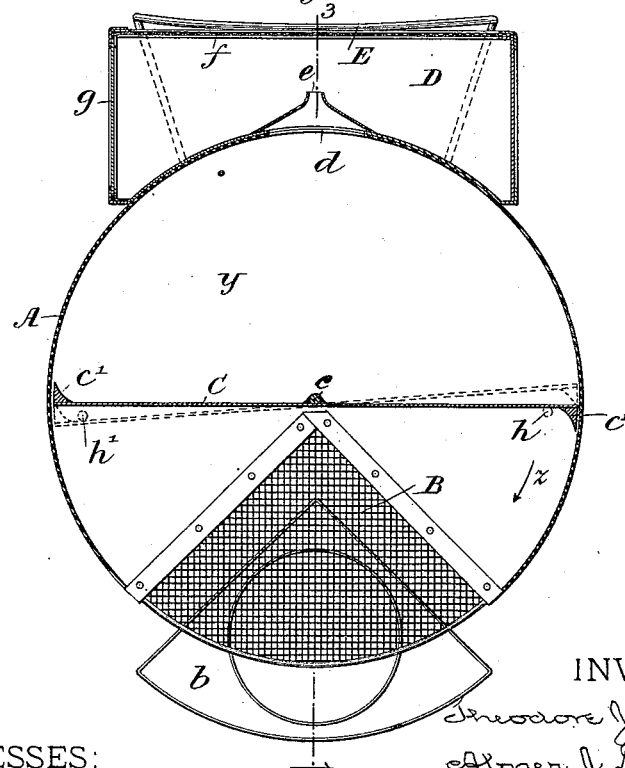
Fig: 2.
WITNESSES:
John A. Renzie.
J. B. Baplinger
INVENTOR:
Theodore J. Baker,
Abner J. Stanchfield,
By Henry Connett
Attorney.

(No Model.) 2 Sheets—Sheet 2.
T. J. BAKER & A. J. STANCHFIELD.
TRAP FOR FLIES OR OTHER INSECTS.
No. 427,290. Patented May 6, 1890.
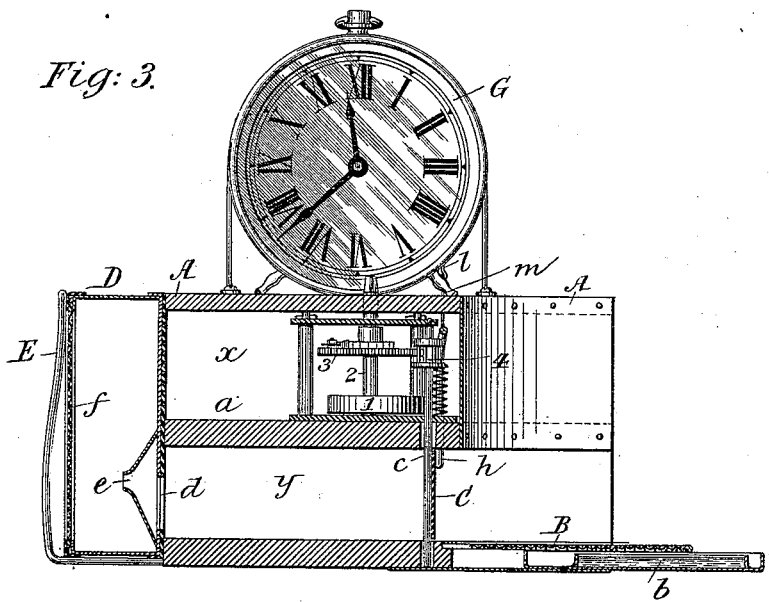
Fig: 3.
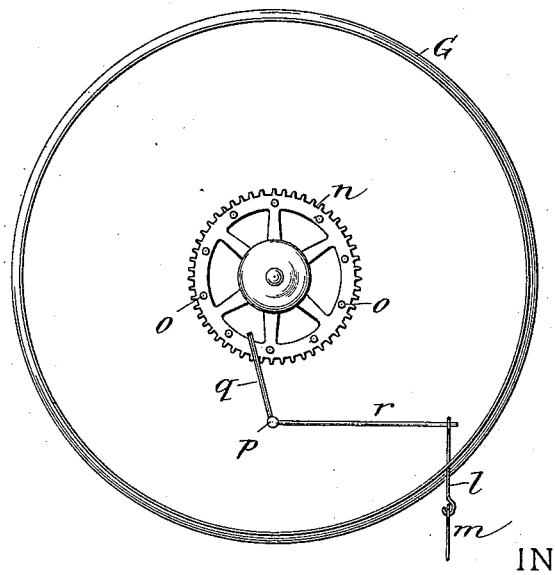
Fig: 4.
WITNESSES:
John A. Rennie.
J. B. Saplinger
INVENTOR:
Theodore J. Baker,
Abner J. Stanchfield,
By Henry Connett
Attorney.

UNITED STATES PATENT OFFICE.

THEODORE J. BAKER AND ABNER J. STANCHFIELD, OF SALT LAKE CITY, UTAH TERRITORY.

TRAP FOR FLIES OR OTHER INSECTS.

SPECIFICATION forming part of Letters Patent No. 427,290, dated May 6, 1890.

Application filed December 21, 1889. Serial No. 334,545. (No model.)

*To all whom it may concern:*

Be it known that we, THEODORE J. BAKER and ABNER J. STANCHFIELD, both citizens of the United States, residing in the city and county of Salt Lake, and Territory of Utah, have invented certain Improvements in Traps for Flies or other Insects, of which the following is a specification.

Our invention relates to that class of devices used for entrapping insects, commonly called "fly-traps," as they are ordinarily employed for catching house-flies.

The characteristic features of our trap are as follows: A feeding-ground is provided whereat bait is spread to attract the flies, and over this ground at proper times a sweep plays suddenly and rapidly. This sweep is actuated by some suitable power, preferably a spring-power, adapted to be wound up like a clock. The detent that holds the sweep is controlled by an ordinary clock—such as the small desk-clock or "Ansonia clock" in common use. The flies swept off the feeding-ground are driven into a dark chamber, from which there is but one exit leading into a detachable cage composed, preferably, of wire-gauze in part, in order that it may be light, and thus attract the flies from the dark chamber.

In the accompanying drawings, which serve to illustrate one embodiment of our invention, Figure 1 is a front elevation of the trap, the outer drum-like shell of the casing being removed in part in order to expose the interior of the trap. Fig. 2 is a sectional plan of the trap, the plane of the section being indicated by line 2 2 in Fig. 1. Fig. 3 is a vertical section taken on line 3 3 in Fig. 2. Fig. 4 is a fragmentary view on a larger scale than the principal figures, showing a portion of the interior mechanism of the clock, whereby the sweep-detent is operated.

A is a casing in the form of a drum, being circular in plan. This casing is divided into upper and lower compartments by a horizontal partition $a$. At the front of the casing a triangular portion of the same is removed to provide room for what we call a "feeding-ground" B. This ground will be of wire-gauze or other foraminous material, on which the flies or insects may alight. Under this gauze platform is a space in which is placed a removable tray $b$, to contain some sweet substance to attract the insects. In Fig. 2 this tray is represented (for illustrative purposes merely) as partly drawn out. There will be or need be no molasses or other sweet substance in the foraminous platform B.

In the lower compartment of the casing is mounted a sweep C, in the nature of a strip or plate of light material, the width of which equals the height of said compartment and the length of which equals the internal diameter of the circular casing. This sweep is fixed at its middle to a vertically-arranged arbor or shaft $c$, set in bearings at the center of the casing and extending up into the upper compartment $x$ thereof. When the arbor or shaft $c$ is rotated, the sweep plays over the feeding-ground B and drives the insects from the same back into a dark chamber $y$ in the lower compartment of the casing A back of the sweep C, the latter forming when at rest, as in Fig. 2, a close partition which divides this lower compartment and prevents the insects from escaping at the front of the casing. Being in the dark, the insects will be led, in seeking the light, to pass through an opening $d$ at the back of casing A into a cage D, which is removably attached to the casing, and has a small aperture $e$ in the apex of a cone formed on its rear wall. Once they have passed through the aperture $e$ into the cage D the insects will not return. The cage will have a gauze front $f$, to admit light and air, and a sliding door $g$, to permit of the removal of the insects. The cage will, by preference, be made to fit up snugly to the casing A, and it will be held in place by a spring-clasp E, made by bending a piece of wire to the form shown and attaching its ends to the base of casing A. The cage D will rest on the two projecting branches of the wire, and the bight or loop of the wire will bear elastically on the front of the cage and hold it firmly but removably to the casing.

The sweep C may be actuated by any suitable motor, such as a clock-spring and suitable gears. In the drawings we have shown such a spring-motor F. This motor comprises a spring 1, a spring winding-arbor 2, a spur-wheel 3 on said arbor, and a pinion 4 on the shaft $c$ of sweep C. Such mechanisms are too well known to require a fuller illustration and description. The arrow $z$ in Fig. 2 shows the direction in which the motor F drives the sweep.

Normally the sweep is stationary in the position seen in Figs. 1 and 2, being held by a detent $h$, and it is permitted at regular intervals to make a half turn or rotation by the withdrawal of said detent. We will describe this detent mechanism and the means for actuating it. In the upper compartment $x$ is a detent-lever $i$, fulcrumed at $i'$. The detent $h$ is on one end of this lever $i$ and plays through a hole in the partition $a$. On the upper end of lever $i$ is a supplementary detent $h'$, which also plays through a hole in said partition. These holes (see Fig. 2) are both so arranged with reference to the sweep that the detents descend in front of the sweep as it stands when at rest, but at opposite ends thereof. A spring or weight $k$ tends to draw down the end of the detent-lever at the right in Fig. 1, and to cause the detent $h$ to protrude down through partition $a$ in front of that end of the sweep C. This movement of course elevates the other end of the detent-lever and withdraws the detent $h$ out of the path of the sweep. Now, the lever $i$ being raised in such a manner as to withdraw the detent $h$, the moment the sweep is free it will be suddenly and forcibly rotated by the motor F, and in its movement over the feeding-ground B it will sweep any insects that may be collected thereon into the dark chamber $y$; but the sweep is stopped before it has made one-half of a full rotation by the detent $h'$, which will have been protruded into its path by the raising or withdrawal of the detent $h$ at the opposite end of said detent-lever $i$. If the detent-lever be now let go or set free, the spring $k$ will draw it down again to the position seen in Fig. 1, and this will have the effect to withdraw the detent $h'$ and protrude the detent $h$. The withdrawal of detent $h$ sets the sweep free momentarily and it moves around until it is stopped by the detent $h$, as at first.

In Fig. 2 the sweep C is represented in dotted lines in the position it assumes when stopped and held by the detent $h'$. The object we have in arranging the detent $h'$ in such a position as to arrest the sweep before it has made a full half turn or rotation is to give the detent $h$ time to descend into the path of the sweep after the lever $i$ shall have been set free. There will be an instant or brief interval when neither of the two detents $h$ and $h'$ will be in the path of the sweep, and it is necessary to so arrange the detents that the sweep shall have to move through a little distance after the detent $h'$ has released it before it is stopped by the detent $h$.

We will now describe the device whereby the detent-lever $i$ is raised at regular intervals and the sweep allowed to swing.

G is a clock, such as the ordinary Ansonia or desk clock. This clock is mounted on the casing A, and the wire $l$, from the interior of the clock-casing, is coupled to a rod $m$, which passes down into the trap-casing A and is coupled to the lever $i$. In Fig. 4 we have shown a part of the interior mechanism of the clock G in order to make clear the connection between the clock and the detent-lever. In this figure $n$ is the center wheel of the clock G, or the next wheel to the mainspring of the clock. This wheel is provided with a series of studs or pins $o\ o$ equally spaced. A rock-shaft $p$ in the clock is provided with an arm or lever $q$, arranged in the path traversed by said pins as the wheel revolves, and this lever is acted upon by each of said pins in succession. Another arm or lever $r$, projecting from said rock-shaft, is coupled to said wire $l$. Thus every time the pins $o$ act on the arm $q$ the shaft $p$ will be rocked and the arm $r$ raised. This movement of the arm $r$ will raise the detent-lever $i$. When the pin $o$ shall have passed by the arm $q$, the spring $k$ will instantly retract the parts. The number of pins $o$ on the wheel $n$ will govern the number of operations of the sweep C in each hour. If ten pins are set in the center wheel, the sweep will operate every six minutes.

The clock G need not be fixed permanently to the casing A, and in the winter, when the trap is not in use, the clock may be readily detached by simply uncoupling the wire $l$ from the rod $m$, when it may be used as a time-piece.

The sweep C may have projecting toes $c'$ at its ends, as shown, of any convenient length. These serve to gather the insects and prevent them from being swept off the front of the feeding-ground. We find it answers the purpose to make the sweep C straight; but it may be curved as well.

Our trap is especially well adapted for catching insects; but it may be employed for catching other living things as well.

Having thus described our invention, we claim—

1. In a trap, the combination, with the casing A, containing a dark chamber $y$, provided with an outlet $d$, of the removable cage D, provided with a contracted aperture $e$ for the insects, and a spring-retainer E on the casing A, whereby the said cage is held in position.

2. In a trap, the combination, with the casing, of the sweep mounted therein, a motor which drives said sweep, the detent-lever $i$, the sweep-detents $h$ and $h'$ on the respective ends of said lever, and the detent-actuating clock G, whereby said detents are controlled.

3. In a trap, the combination, with the casing A, provided with a stationary feeding-ground of foraminous material, of the removable tray $b$, for molasses or the like, adapted to be placed under the foraminous material of the feeding-ground, as set forth.

In witness whereof we have hereunto signed our names in the presence of two subscribing witnesses.

THEODORE J. BAKER.
ABNER J. STANCHFIELD.

Witnesses:
  WILLIAM W. RIVERS,
  HOMER F. ROBINSON.